United States Patent
Zhu

(10) Patent No.: US 12,299,042 B2
(45) Date of Patent: May 13, 2025

(54) GRAPH DATA MANAGEMENT

(71) Applicant: Alipay (Hangzhou) Information Technology Co., Ltd., Hangzhou (CN)

(72) Inventor: Xiaowei Zhu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/572,132

(22) PCT Filed: Nov. 10, 2022

(86) PCT No.: PCT/CN2022/131020
§ 371 (c)(1),
(2) Date: Dec. 19, 2023

(87) PCT Pub. No.: WO2023/083237
PCT Pub. Date: May 19, 2023

(65) Prior Publication Data
US 2024/0289386 A1    Aug. 29, 2024

(30) Foreign Application Priority Data
Nov. 11, 2021 (CN) .......................... 202111329919.1

(51) Int. Cl.
*G06F 16/00*    (2019.01)
*G06F 16/901*    (2019.01)
(52) U.S. Cl.
CPC ................... *G06F 16/9024* (2019.01)
(58) Field of Classification Search
None
See application file for complete search history.

(56) References Cited

U.S. PATENT DOCUMENTS 5,798,841 A * 8/1998 Takahashi ............ H04N 1/1026
399/362
11,086,935 B2 * 8/2021 Bessiere ............. G06F 16/9024
(Continued)

FOREIGN PATENT DOCUMENTS

CN    103593433 A    2/2014
CN    105138528 A    12/2015
(Continued)

OTHER PUBLICATIONS

The International Search Report and Written Opinion for International Application No. PCT/CN2022/131020 mailed on Jan. 18, 2023.

*Primary Examiner* — Jean M Corrielus
(74) *Attorney, Agent, or Firm* — Womble Bond Dickinson (US) LLP

(57) ABSTRACT

A method is applied to a graph database, the graph database stores edge data of a timing graph, the edge data records a plurality of attributes of an edge in the timing graph, the plurality of attributes include a timestamp, an index of the edge data includes a primary index and a secondary index, a value of the primary index is the timestamp, the secondary index stores the plurality of attributes, and a key of the secondary index includes the timestamp. The method includes: receiving a first request, where the first request is used to request to perform an edge scanning operation on the edge data based on a time range; and performing the edge scanning operation on the edge in the timing graph by using the timestamp in the key of the secondary index, to obtain an edge whose timestamp falls within the time range in the timing graph.

6 Claims, 3 Drawing Sheets

(56) References Cited

U.S. PATENT DOCUMENTS

| | | | |
|---|---|---|---|
| 2015/0347479 A1* | 12/2015 | Chen | G06F 16/2264 |
| | | | 707/769 |
| 2015/0347481 A1* | 12/2015 | Chen | G06F 16/51 |
| | | | 707/743 |
| 2017/0069270 A1* | 3/2017 | Hyeon | G09G 3/3216 |
| 2017/0132260 A1* | 5/2017 | Bi | G06F 16/2455 |
| 2017/0308621 A1* | 10/2017 | Wu | G06F 16/24575 |
| 2019/0034553 A1* | 1/2019 | Ni | G06F 16/9024 |
| 2019/0179832 A1* | 6/2019 | Nam | G06F 16/278 |
| 2019/0340303 A1* | 11/2019 | Bessiere | G06F 16/907 |
| 2021/0209218 A1* | 7/2021 | Watson | H04W 12/06 |

FOREIGN PATENT DOCUMENTS

| | | | | |
|---|---|---|---|---|
| CN | 108256088 A | | 7/2018 | |
| CN | 108572958 A | | 9/2018 | |
| CN | 112287182 A | * | 1/2021 | ......... G06F 16/9024 |
| CN | 113127660 A | * | 7/2021 | |
| CN | 113190718 A | | 7/2021 | |
| CN | 113779286 A | | 12/2021 | |
| CN | 112287182 B | * | 9/2023 | ......... G06F 16/9024 |

* cited by examiner

Primary index

| | Key | Value |
| --- | --- | --- |
| Edge 1 | (Vertex 0, type 0, vertex 1) | (Timestamp 1) |
| Edge 4 | (Vertex 0, type 0, vertex 2) | (Timestamp 3) |
| Edge 3 | (Vertex 0, type 0, vertex 3) | (Timestamp 2) |
| Edge 2 | (Vertex 1, type 0, vertex 2) | (Timestamp 2) |
| Edge 5 | (Vertex 3, type 0, vertex 2) | (Timestamp 3) |

Secondary index
|        | Key                                        | Value                          |
|--------|--------------------------------------------|--------------------------------|
| Edge 1 | (Vertex 0, type 0, timestamp 1, vertex 1)  | (Attribute 1, ..., attribute n) |
| Edge 4 | (Vertex 0, type 0, timestamp 2, vertex 3)  | (Attribute 1, ..., attribute n) |
| Edge 3 | (Vertex 0, type 0, timestamp 3, vertex 2)  | (Attribute 1, ..., attribute n) |
| Edge 2 | (Vertex 1, type 0, timestamp 2, vertex 2)  | (Attribute 1, ..., attribute n) |
| Edge 5 | (Vertex 3, type 0, timestamp 3, vertex 2)  | (Attribute 1, ..., attribute n) |
FIG. 6
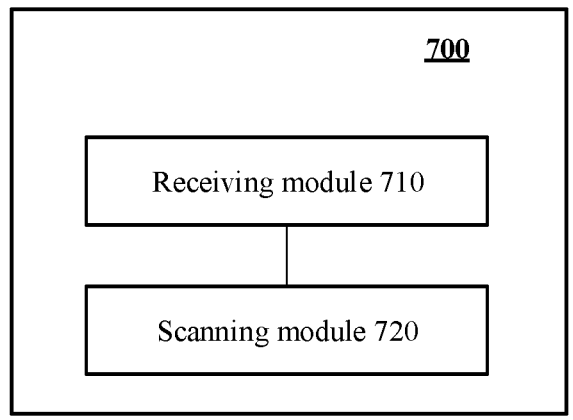
FIG. 7
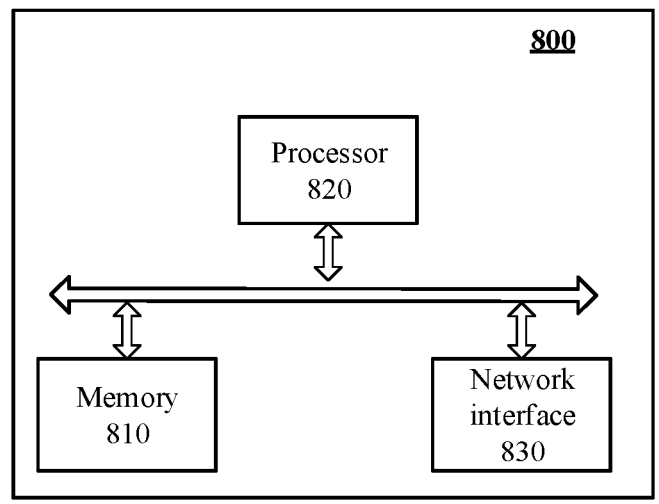
FIG. 8

GRAPH DATA MANAGEMENT

CROSS-REFERENCE TO RELATED APPLICATIONS

This application is a national stage entry of International Application No. PCT/CN2022/131020, filed on Nov. 10, 2022, which claims priority to Chinese Application No. 202111329919.1, filed on Nov. 11, 2021, the contents of each of which are incorporated herein by reference in their entirety.

TECHNICAL FIELD

The present disclosure relates to the data processing field, and in particular, to a method and an apparatus for managing graph data.

BACKGROUND

During processing of a timing graph, it is often necessary to perform an edge scanning operation on edge data of the timing graph based on a time range, so as to acquire an edge whose timestamp falls within the time range. However, a key (that is, a primary key) of a primary index of the edge data does not include a timestamp of the edge, resulting in low efficiency of the edge scanning operation.

To improve the efficiency of the edge scanning operation, some conventional technologies introduce a secondary index on the basis of the primary index. Like the primary index, the secondary index retains all attributes of the edge. The secondary index differs from the primary index in that the key of the secondary index includes the timestamp of the edge. In this way, a user can complete an edge scanning operation in a time sequence by accessing the secondary index.

However, in the conventional technology, an attribute of an edge needs to be stored in two copies in the primary index and the secondary index, resulting in large overheads of storage space.

SUMMARY

In view of the foregoing description, the present disclosure provides a method and an apparatus for managing graph data, so as to reduce overheads of storage space.

According to a first aspect, a method for managing graph data is provided, where the method is applied to a graph database, the graph database stores edge data of a timing graph, the edge data records a plurality of attributes of an edge in the timing graph, the plurality of attributes include a timestamp, an index of the edge data includes a primary index and a secondary index, a value of the primary index is the timestamp, the secondary index stores the plurality of attributes, and a key of the secondary index includes the timestamp; the method includes: receiving a first request, where the first request is used to request to perform an edge scanning operation on the edge data based on a time range; and performing the edge scanning operation on the edge in the timing graph by using the timestamp in the key of the secondary index, to obtain an edge whose timestamp falls within the time range in the timing graph.

Optionally, in some embodiments, a key and a value of the primary index jointly form the key of the secondary index.

Optionally, in some embodiments, the method further includes: when a target edge in the timing graph needs to be updated or deleted, searching the primary index for the target edge to obtain a position of the target edge in the primary index; constructing the key of the secondary index based on a key and a value that are recorded at the position; searching the secondary index for the target edge based on the key of the secondary index to obtain a position of the target edge in the secondary index; and updating or deleting the target edge based on the positions of the target edge in the primary index and the secondary index.

Optionally, in some embodiments, the key of the primary index successively includes a source vertex, an edge type, and a destination vertex of the edge in the timing graph.

Optionally, in some embodiments, the key of the secondary index successively includes a source vertex, an edge type, a timestamp, and a destination vertex of the edge in the timing graph.

According to a second aspect, an apparatus for managing graph data is provided, where the graph data is stored in a graph database, the graph database stores edge data of a timing graph, the edge data records a plurality of attributes of an edge in the timing graph, the plurality of attributes include a timestamp, an index of the edge data includes a primary index and a secondary index, a value of the primary index is the timestamp, the secondary index stores the plurality of attributes, and a key of the secondary index includes the timestamp; the apparatus includes: a receiving module, configured to receive a first request, where the first request is used to request to perform an edge scanning operation on the edge data based on a time range; and a scanning module, configured to perform the edge scanning operation on the edge in the timing graph by using the timestamp in the key of the secondary index, to obtain an edge whose timestamp falls within the time range in the timing graph.

Optionally, in some embodiments, a key and a value of the primary index jointly form the key of the secondary index.

Optionally, in some embodiments, the apparatus further includes: a querying module, configured to: when a target edge in the timing graph needs to be updated or deleted, search the primary index for the target edge to obtain a position of the target edge in the primary index; a constructing module, configured to construct the key of the secondary index based on a key and a value that are recorded at the position; a searching module, configured to search the secondary index for the target edge based on the key of the secondary index to obtain a position of the target edge in the secondary index; and an updating module, configured to update or delete the target edge based on the positions of the target edge in the primary index and the secondary index.

Optionally, in some embodiments, the key of the primary index successively includes a source vertex, an edge type, and a destination vertex of the edge in the timing graph.

Optionally, in some embodiments, the key of the secondary index successively includes a source vertex, an edge type, a timestamp, and a destination vertex of the edge in the timing graph.

According to a third aspect, a device is provided, including a memory and a processor, where the memory stores executable code, and the processor is configured to execute the executable code to implement the method according to the first aspect.

According to a fourth aspect, a computer-readable storage medium is provided, where the computer-readable storage medium stores executable code, and the executable code is executed to implement the method according to the first aspect.

According to a fifth aspect, a computer program product is provided, including executable code, and the executable code is executed to implement the method according to the first aspect.

In the embodiments of the present disclosure, the primary index does not store all attributes of the edge, but stores only the timestamp of the edge, thereby reducing data redundancy and reducing overheads of storage space.

BRIEF DESCRIPTION OF DRAWINGS

FIG. 6 is a schematic diagram of a storage structure of a secondary index of an edge according to an embodiment of the present disclosure;

FIG. 7 is a schematic structural diagram of an apparatus for managing graph data according to an embodiment of the present disclosure; and FIG. 8 is a schematic structural diagram of an apparatus according to an embodiment of the present disclosure.

DESCRIPTION OF EMBODIMENTS

The following describes technical solutions in the present disclosure with reference to accompanying drawings.

A graph database is a data model used to describe an association relationship between objects. The graph database uses a graph structure for semantic query, and uses vertices, edges, and attributes to represent and store data. Compared with a conventional relational model, the graph database is used for processing queries involving complex multi-hop relationships, so that the expression is more natural and the processing is more efficient.

Figure 1:
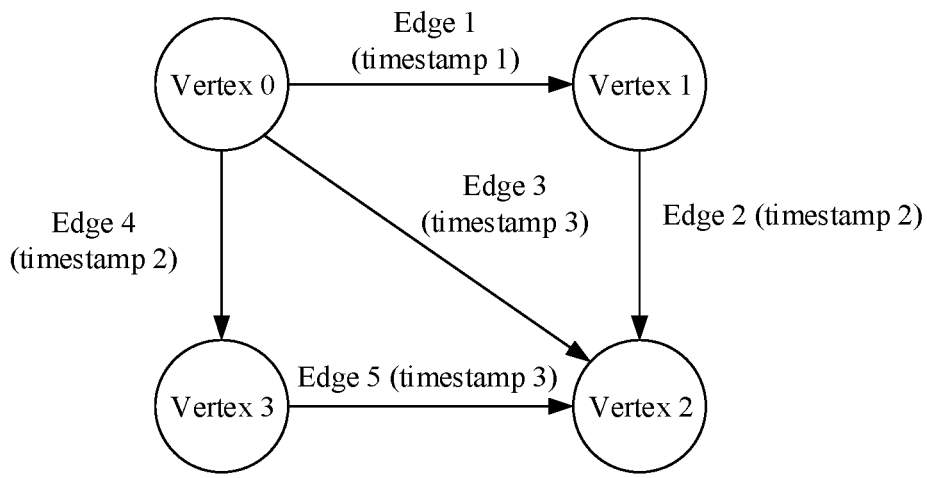
FIG. 1 is a schematic diagram of a graph according to an embodiment of the present disclosure.

FIG. 1 is a schematic diagram of a graph according to an embodiment of the present disclosure. The following briefly describes the graph by using FIG. 1 as an example.

As shown in FIG. 1, the graph generally includes vertices and edges. A vertex may also be referred to as a node or a junction, and an edge may also be referred to as a relationship. Data of the vertex may include a vertex identifier, a vertex type, etc. The vertex identifier is used to uniquely identify a vertex. Data of the edge may include a source vertex, a destination vertex, and an edge attribute. The source vertex of the edge is a starting vertex of the edge, and the destination vertex of the edge is a vertex to which the edge points. For example, in FIG. 1, a source vertex of an edge 1 is a vertex 0, and a destination vertex is a vertex 1.

The data of the vertex and edge may be related to a service. For example, in a social network scenario, the vertex identifier may be a person's identity card number, a person number, etc. The attributes of the vertex and edge can be set based on user requirements. For example, the attribute of the vertex may include an age, an education, an address, an occupation, etc. The attribute of the edge may include a relationship between vertices, for example, a classmate relationship, a colleague relationship, and a friend relationship.

In some embodiments, the vertex and/or edge of the graph includes a timestamp attribute, and such a graph that includes a timestamp attribute may also be referred to as a timing graph. The timing graph can be stored and managed by using a key-value database. The key-value database is a database that is organized, indexed, and stored in a form of a key-value pair. The key-value pair includes a value part and a key part. In general, some attributes in the data for query and/or scanning are specified as keys, and the remaining attribute information of the data is stored as a value.

The key of the primary index may be referred to as the primary key, which is used to uniquely identify a vertex or an edge in a timing graph that is stored and managed using a key-value database. Due to general rules (for example, in some databases, the primary key cannot be updated after the graph database is created), the primary key generally should not include dynamically changing data (such as a timestamp and a creation time column).

Figure 2:
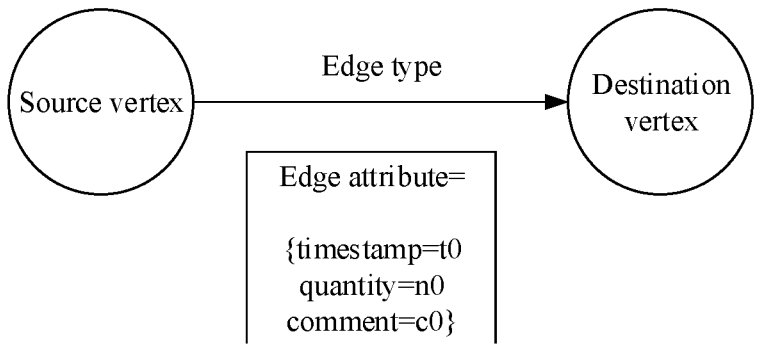
FIG. 2 is a schematic diagram of edge data according to an embodiment of the present disclosure.

FIG. 2 is a schematic diagram of edge data according to an embodiment of the present disclosure. The edge data shown in FIG. 2 can be stored in the primary index. The primary index can be constructed in a form of a key-value pair. For example, the key of the primary index may be a triplet (a source vertex, an edge type, and a destination vertex), and the value of the primary index may be a remaining attribute except the primary key in a plurality of attributes of the edge data.

The edge of the graph may have a plurality of attributes, and a specific quantity and type of the attributes can be set by the user as needed. For example, for the edge data shown in FIG. 2, the value of the primary index may include a timestamp, a quantity, a comment, etc. It can be understood that a larger amount of attribute data leads to larger space occupied by each attribute. Correspondingly, larger storage space is occupied by data of each edge, that is, larger storage space is occupied by the primary index.

For a graph database, edge scanning is the core of graph data processing (e.g., graph database query and iterative graph computing). Edge scanning may also be referred to as edge range lookup. In some embodiments, an edge scanning operation on the timing graph is an operation of scanning an edge adjacent to a vertex by using the vertex as a center and according to a specific rule, thereby acquiring needed edge data. For example, the edge scanning operation is scanning data of all edges adjacent to the current vertex, where the edges start from the current vertex and have timestamps within a specific time range (for example, the time range may be from a latest edge to a moment, or may be all edges before a moment). The edge scanning operation can be implemented by using a plurality of methods, for example, edge scanning can be performed on the stored edge data by using a method such as a binary search or a quad search.

For an edge scanning operation, a key setting method for an index determines a usage scope of the index. For example, when a key of an index successively includes a source vertex, an edge type, and a destination vertex, the index can be used to efficiently scan all edges starting from a vertex X, and the vertex X is any vertex in the graph. The index can also be used to efficiently scan all edges starting from the vertex X and having the edge type M. Certainly, the index can also be used to efficiently scan all edges starting from the vertex X and having the edge type M and the destination vertex Y.

However, if only the source vertex X and the destination vertex Y are known, without knowing the edge type, for the above-mentioned index setting method, it is equivalent to knowing only the first attribute of the key of the index. In this case, using this index for edge scanning cannot make full use of the advantages of key-value pair indexing, resulting in low scanning efficiency.

A timing graph may include a plurality of vertices and a plurality of edges. In some embodiments, operations such as graph lookup or scanning can be decomposed into a plurality of lookup or scanning operations on edges starting from a specific vertex. For example, still referring to FIG. 1, if data of all edges starting from vertex 0 needs to be acquired, edges between vertex 0 and vertices 1-3, edges between vertex 1 and vertex 2, and edges between vertex 3 and vertex 2 need to be scanned. This edge scanning process can be decomposed into separately scanning all edges starting from vertex 0, all edges starting from vertex 1, and all edges starting from vertex 3, and aggregating the scanning results. It can be learned that the main performance of a timing graph system usually depends on the scanning efficiency of edges corresponding to the nodes of the graph.

To improve the efficiency of edge scanning, a secondary index can be added, so that a key of the secondary index includes timestamp information. In this case, in some embodiments, the secondary index is continuous data stored in chronological order. The value of the secondary index can store a pointer to the primary index.

However, when the secondary index does not include the attribute information of the edge that needs to be acquired during the current scanning, after the secondary index is located, the primary index needs to be searched for based on the pointer of the primary index in the secondary index, and the attribute information stored in the primary index is returned.

For example, in a social network, user A wants to acquire comments on user A made by fans of user A within a specific time range. Because the secondary index stores only the pointer to the primary index, after a corresponding edge is located in the secondary index, the pointer of the primary index needs to be further acquired by using a value in the edge of the secondary index. The position of the edge in the primary index is located based on the pointer of the primary index, and the needed comment information is acquired.

It can be understood that although the secondary index is stored in chronological order, the storage method for the primary index is random storage relative to the timestamp attribute. Therefore, access to the primary index in this case is still random access. The primary index and the secondary index that are set using this method still encounter the problem of low efficiency.

In some embodiments, the value of the primary index can alternatively be replicated in the value of the secondary index. That is, the secondary index also includes a plurality of attributes of an edge. In this case, when an edge scanning operation is performed based on a time range, only the secondary index needs to be retrieved. Because there is no need to perform an edge scanning operation on the primary index again, the scanning efficiency is effectively improved.

However, because all attributes are stored in two copies in the primary index and the secondary index, this method leads to large space overheads. In particular, when there is a large amount of attribute information of an edge, or a data volume of attribute data is large, duplicate storage of data results in huge data redundancy.

Embodiments of the present disclosure provide a method and an apparatus for managing graph data.

Figure 3:
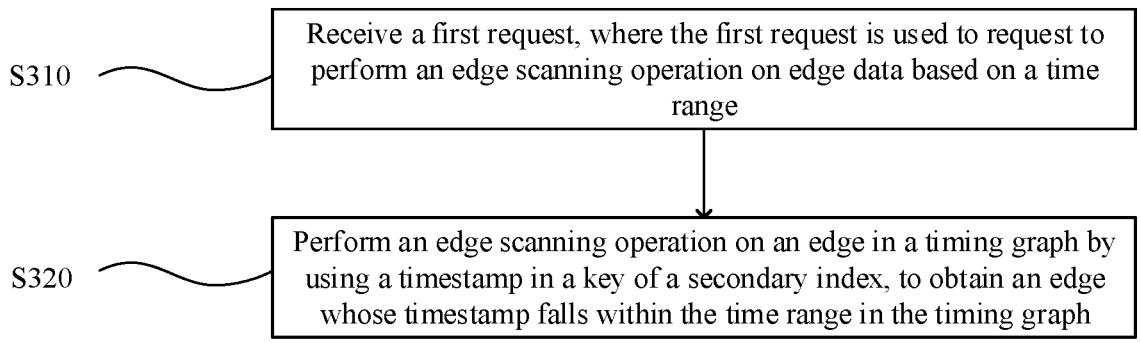
FIG. 3 is a schematic flowchart of a method for retrieving a timing graph according to an embodiment of the present disclosure.

The following describes in detail a method for retrieving a timing graph according to an embodiment of the present disclosure with reference to FIG. 3 to FIG. 6. FIG. 3 is a schematic flowchart of a method for retrieving a timing graph according to an embodiment of the present disclosure.

The method in the present disclosure is applied to a graph database, where the graph database stores edge data of a timing graph. The edge data records a plurality of attributes of an edge in the timing graph. The plurality of attributes of the edge can be set based on user requirements. The plurality of attributes may refer to all attributes that the edge of the graph has. In some embodiments, the plurality of attributes may include a timestamp.

The index of the edge data includes a primary index and a secondary index. In some embodiments, a value of the primary index is the above-mentioned timestamp. A key of the primary index can be set arbitrarily as needed, provided that a setting rule for the primary key in the graph database is satisfied. In some embodiments, the key of the primary index can be set to successively include a source vertex, an edge type, and a destination vertex of the edge in the timing graph. Information about an edge can be uniquely determined by using a triplet of a source vertex, an edge type, and a destination vertex. By using the source vertex as the beginning of the key, edges starting from the same vertex can be clustered together for continuous storage, thereby efficiently supporting a scanning operation on an edge that is centered on a vertex.

The secondary index stores the plurality of attributes, and the key of the secondary index includes the timestamp. That is, the index setting method provided in the embodiment of the present disclosure is to store all the plurality of attributes of the edge data of the graph in the secondary index, while storing only the primary key and the timestamp in the primary index.

Compared with storing all the plurality of attributes of the edge in the primary index in a conventional graph database, in the embodiment of the present disclosure, only a timestamp of the edge is stored in the value of the primary index, and all the plurality of attributes of the edge are stored in the secondary index, thereby reducing data redundancy and reducing overheads of storage space.

A specific composition form of the key of the secondary index can be set as needed. For example, the key of the secondary index can be formed jointly by the key and value of the primary index. In some embodiments, the key of the secondary index can be formed by inserting the value of the primary index into a specific position in the key of the primary index. For example, when the key of the primary index is <source vertex, edge type, destination vertex> in sequence, and the value of the primary index is timestamp, the value of the primary index (i.e., timestamp) can be inserted into the key of the primary index to form the key of the secondary index. Specifically, the key of the secondary index may be <source vertex, timestamp, edge type, destination vertex> in sequence, or <source vertex, edge type, timestamp, destination vertex> in sequence.

In some embodiments, the secondary index may be an ordered index that is sorted by key. By setting the timestamp in the key of the secondary index, the edge data can be stored continuously in chronological order in the secondary index. In some embodiments, continuous storage in chronological order may mean that the edge data of the graph is stored continuously in the storage space in chronological order in the storage space corresponding to the secondary index. When an edge scanning operation is performed, only a position of an edge corresponding to a start timestamp and/or an end timestamp of a time range to be scanned in the secondary index can be located. Remaining edges can be read continuously from the position of the secondary index corresponding to the located edge data.

Through ordered storage of the secondary index, only a limited quantity of edge scanning operations (for example, locating the position of the edge data corresponding to the start timestamp of the time range and the position of the edge data corresponding to the end timestamp) are required to acquire all the edge data to be scanned. Therefore, scanning efficiency of edge scanning by time is effectively improved.

References are made to FIG. 3. Step S310: Receive a first request, where the first request is used to request to perform an edge scanning operation on the edge data based on a time range.

In some embodiments, the first request can be generated automatically based on user requirements. The first request may be a search expression, a search term, etc. Certainly, the first request can alternatively be manually entered by the user. A specific implementation and a specific form of the first request are not limited in this specification.

The time range can be arbitrarily set as needed. For example, the time range can be set to all times with timestamps starting from a specific moment. The time range can alternatively be set to a period of time from a moment to another moment.

In some embodiments, performing a scanning operation on edge data based on a time range may be scanning, by using a specific vertex as a source vertex, an edge that is adjacent to the source vertex and that has a timestamp within a specific time range.

Step S320: Perform the edge scanning operation on the edge in the timing graph by using the timestamp in the key of the secondary index, to obtain an edge whose timestamp falls within the time range in the timing graph.

In some embodiments, the key of the secondary index may successively include a source vertex, an edge type, a timestamp, and a destination vertex of the edge in the timing graph.

In many application scenarios, edge data that starts from a source vertex and belongs to a specific edge type and that is within a specific time range needs to be acquired. For example, in a social network, a quantity of fans (edge types) obtained by a specific user (source vertex) within a time range (timestamp) is acquired. Setting the timestamp at the third bit of the key of the secondary index can improve efficiency of edge scanning for the above-mentioned scenario.

It can be learned from the foregoing description that a plurality of attributes of edge data are stored in the secondary index in the graph database to which the method provided in the embodiment of the present disclosure is applied. That is, all attribute information of the edge is stored in the secondary index. Because the primary index does not store all attributes of the edge, but stores only the timestamp of the edge, data redundancy is reduced and overheads of storage space are reduced.

During processing of the graph, an edge usually needs to be updated or deleted.

For example, in a social network, after user A unfollows user B, the target edge with user A as the source vertex, user B as the destination vertex, and the follow as the edge type needs to be deleted from the graph database.

For another example, in a lending network, user C initiates a transaction to user D, for example, user C makes a loan to user D. After the loan transaction is completed, the data of the target edge with user C as the source vertex, user D as the destination vertex, and the loan as the edge type needs to be updated in the graph database.

To improve efficiency of updating or deleting an edge in the graph database, the present disclosure further provides a method for updating or deleting an edge.

Figures 4, 5:
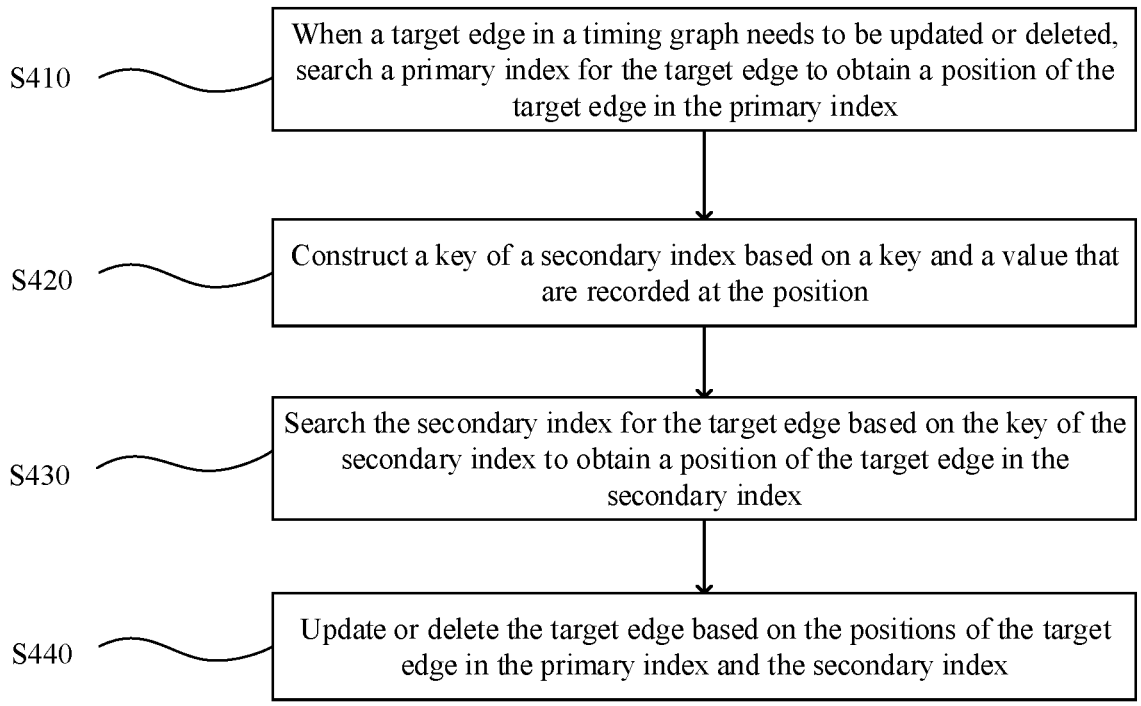
FIG. 4 is a schematic flowchart of a method for updating or deleting an edge of a timing graph according to an embodiment of the present disclosure.
FIG. 5 is a schematic diagram of a storage structure of a primary index of an edge according to an embodiment of the present disclosure.

FIG. 4 is a schematic flowchart of a method for updating or deleting an edge of a timing graph according to an embodiment of the present disclosure. As shown in FIG. 4, the method for managing graph data provided in the present disclosure may further include: Step S410: When a target edge in the timing graph needs to be updated or deleted, search the primary index for the target edge to obtain a position of the target edge in the primary index.

The target edge is an edge that needs to be updated or deleted in the graph database. Because an edge in the graph data represents a relationship between two vertices, when a target edge is updated or deleted, a timestamp of the target edge is usually unknown. In this case, it can be learned from the foregoing description of the index use that, if the target edge is directly located in the secondary index, an advantage of the secondary index cannot be fully utilized in fact, and positioning efficiency is low.

In the embodiment of the present disclosure, the key of the primary index does not include timestamp information. Therefore, when an edge is updated or deleted, the target edge can be quickly located by using the primary index.

Step S420: Construct the key of the secondary index based on a key and a value that are recorded at the position.

In this embodiment, a key and a value of the primary index can jointly form the key of the secondary index. For a specific formation method, references can be made to related description in FIG. 3.

After the target edge is located based on the primary index, the key of the secondary index can be conveniently constructed by using the key and the value of the primary index. For example, the key of the primary index is <source vertex, edge type, destination vertex>, and the value of the primary index is timestamp. The key of the secondary index is <source vertex, edge type, timestamp, destination vertex>. After the position of the primary index corresponding to the target edge is located based on the key of the primary index, a value of the target edge recorded in the primary index is read to obtain the timestamp of the target edge. The timestamp of the target edge is inserted into the key of the primary index to form the key of the secondary index.

Steps S430 and S440: Search the secondary index for the target edge based on the key of the secondary index to obtain a position of the target edge in the secondary index. Update or delete the target edge based on the positions of the target edge in the primary index and the secondary index.

After the key of the secondary index is determined, the position of the target edge in the secondary index can be quickly located based on the key of the secondary index. After the positions of the target edge in the primary index and the secondary index are determined, records of the target edge in the primary index and the secondary index can be updated or deleted accordingly.

According to the method for updating or deleting an edge in the graph database provided in this embodiment, fast positioning and deleting of the edge can be implemented, thereby further improving efficiency of managing the edge in the graph database.

The value of the primary index is set to the timestamp of the edge data of the timing graph, and the key of the secondary index is formed by the key and the value of the primary index, thereby greatly optimizing the index storage method. That is, only the key and the timestamp of the primary index are redundantly stored in the primary index and the secondary index. For a graph database with a large amount of attribute information of edge data, using this storage method can reduce data redundancy and effectively improve utilization of storage space. In addition, according to this storage method, the key of the secondary index can be formed jointly by the key and the value of the primary index, so that fast positioning and processing can be implemented during updating and deleting of an edge.

The method for managing graph data in the present disclosure is described in detail below by using FIG. 2, FIG. 5, and FIG. 6 as examples. The graph shown in FIG. 2 includes timestamp information, and therefore may also be referred to as a timing graph. The graph shown in FIG. 2 includes four vertices (vertex 0, vertex 1, vertex 2, and vertex 3), and five edges (edge 1, edge 2, edge 3, edge 4, and edge 5).

It can be understood that there may be a plurality of edge types corresponding to edges in a graph, and the edges may correspond to different edge types. For example, the type of edge 1 may be friend, and the type of edge 2 may be colleague. To simplify the description, in the timing graph shown in FIG. 2, all edges correspond to the same edge type, denoted as type 0. Type 0 may refer to any edge type, for example, may refer to a friend type or a loan type.

The timing graph shown in FIG. 2 can be stored using the storage methods for the primary index and the secondary index shown in FIG. 5 and FIG. 6. FIG. 5 is a schematic diagram of a storage structure of a primary index of an edge according to an embodiment of the present disclosure. In FIG. 5, the key of the primary index is <source node, edge type, destination node>, and the key and the value of the primary index are stored in continuous storage space in an order corresponding to the key of the primary index. For example, edge data of the timing graph shown in FIG. 2 can be stored continuously in an order of edge 1, edge 4, edge 3, edge 2, and edge 5.

Because the key of the primary index does not include a timestamp, the primary index of the edge cannot be stored in a time sequence. When edge data within a specific time period corresponding to a specific vertex needs to be acquired, efficiency of using the primary index for retrieval is quite low. FIG. 5 is used as an example. When edge data that starts from vertex 0 and whose timestamp range is [timestamp 2, timestamp 3] needs to be acquired, edge scanning operations need to be performed on all edge data that starts from vertex 0, so as to acquire the needed edge data.

FIG. 6 is a schematic diagram of a storage structure of a secondary index according to an embodiment of the present disclosure. To improve efficiency of the edge scanning operation, as shown in FIG. 6, a secondary index whose key includes timestamp information can be added. Attributes (attribute 1, . . . , attribute n) in the value of the secondary index shown in FIG. 6 are only examples indicating that the edge of the graph may include a plurality of attributes. Attribute 1 and attribute n may be any edge attribute (for example, attribute 1 may refer to a loan amount, and attribute n may refer to a quantity of comments).

The secondary index provided in this embodiment is stored in order of keys. That is, in the secondary index provided in this embodiment, edge data of the timing graph shown in FIG. 2 is stored in an order of edge 1, edge 4, edge 3, edge 2, and edge 5. It can be learned that in this embodiment, the edges of the primary index and the secondary index are stored in different orders.

In the secondary index shown in FIG. 6, when edge data that starts from vertex 0 and whose timestamp range is greater than or equal to timestamp 2 needs to be acquired, it is only necessary to first locate an index position of edge 4 through edge scanning, and then sequentially read remaining edges.

However, for a target edge where only the source vertex, edge type and destination vertex of the edge are known, when the above-mentioned secondary index is used, because the destination vertex is located at the fourth bit in the key of the secondary index, it is equivalent to that only the first two bits (the source vertex and the edge type) of the secondary index can be used for indexing, and consequently the position of the target edge cannot be directly located. When a target edge needs to be updated or deleted, timestamp information of the target edge is usually unknown. In this case, locating the target edge by using the secondary index leads to low efficiency.

To ensure efficiency of updating or deleting an edge, an embodiment of the present disclosure specifies that the key of the secondary index is formed jointly by the key and the value of the primary index. In this embodiment, during updating or deleting of the target edge, an edge scanning operation is first performed in the primary index, so as to quickly locate the position of the target edge in the primary index. Because the value of the primary index stores the timestamp of the target edge, the key of the secondary index can be formed using the key and the value of the primary index of the target edge. Specifically, it can be set that the key of the primary index is (source vertex, edge type, destination vertex), and the value of the primary index is timestamp. The key of the secondary index is (source vertex, edge type, timestamp, destination vertex).

After the primary index of the target edge is located through edge scanning, the key of the secondary index can be obtained through concatenation using the key and the value of the primary index. The edge scanning operation is performed in the secondary index by using the key of the secondary index that is obtained through concatenation, so as to quickly locate the position of the target edge in the secondary index. After the positions of the target edge in the primary index and the secondary index are determined, the data of the target edge is updated or deleted.

It can be learned from the foregoing analysis that, using the storage method for the primary index and the secondary index provided in the present disclosure can further ensure efficiency of updating and deleting an edge on the basis of reducing data redundancy and improving space utilization.

The method embodiments of the present disclosure are described in detail above with reference to FIG. 1 to FIG. 6, and apparatus embodiments of the present disclosure are described in detail below with reference to FIG. 7 and FIG. 8. It should be understood that the descriptions of the method embodiments correspond to the descriptions of the apparatus embodiments. Therefore, for a part not described in detail, references can be made to the above-mentioned method embodiments.

FIG. 7 is a schematic structural diagram of an apparatus for managing graph data according to an embodiment of the present disclosure. The apparatus shown in FIG. 7 can be used for the above-mentioned method for managing graph data. The apparatus 700 shown in FIG. 7 may include a receiving module 710 and a scanning module 720.

In the apparatus shown in FIG. 7, the graph data is stored in a graph database, the graph database stores edge data of a timing graph, the edge data records a plurality of attributes of an edge in the timing graph, the plurality of attributes include a timestamp, an index of the edge data includes a primary index and a secondary index, a value of the primary index is the timestamp, the secondary index stores the plurality of attributes, and a key of the secondary index includes the timestamp.

As shown in FIG. 7, the receiving module 710 may be configured to receive a first request, where the first request is used to request to perform an edge scanning operation on the edge data based on a time range.

The scanning module 720 may be configured to perform the edge scanning operation on the edge in the timing graph by using the timestamp in the key of the secondary index, to obtain an edge whose timestamp falls within the time range in the timing graph.

Using the apparatus shown in FIG. 7 to manage graph data can reduce data redundancy and reduce overheads of storage space.

Optionally, in some embodiments, a key and a value of the primary index jointly form the key of the secondary index.

Optionally, in some embodiments, the apparatus 700 may further include a querying module 730, a constructing module 740, a searching module 750, and an updating module 760.

The querying module 730 may be configured to: when a target edge in the timing graph needs to be updated or deleted, search the primary index for the target edge to obtain a position of the target edge in the primary index.

The constructing module 740 may be configured to construct the key of the secondary index based on a key and a value that are recorded at the position.

The searching module 750 may be configured to search the secondary index for the target edge based on the key of the secondary index to obtain a position of the target edge in the secondary index.

The updating module 760 may be configured to update or delete the target edge based on the positions of the target edge in the primary index and the secondary index.

Optionally, in some embodiments, the key of the primary index successively includes a source vertex, an edge type, and a destination vertex of the edge in the timing graph.

Optionally, in some embodiments, the key of the secondary index successively includes a source vertex, an edge type, a timestamp, and a destination vertex of the edge in the timing graph.

FIG. 8 is a schematic structural diagram of an apparatus according to an embodiment of the present disclosure. The apparatus 800 may be, for example, a user terminal or a portable device. The apparatus 800 may include a memory 810 and a processor 820. The memory 810 may be configured to store executable code. The processor 820 may be configured to execute the executable code stored in the memory 810 to implement the steps in the methods described above. In some embodiments, the apparatus 800 may further include a network interface 830 and data exchange between the processor 820 and an external device can be implemented by using the network interface 830.

It should be understood that sequence numbers of the above-mentioned processes do not mean execution sequences in the embodiments of the present disclosure. The execution sequences of the processes should be determined based on functions and internal logic of the processes, and should not be construed as any limitation on the implementation processes of the embodiments of the present disclosure.

All or some of the above-mentioned embodiments can be implemented by using software, hardware, firmware, or any combination thereof. When being implemented by using software, the embodiments can be implemented completely or partially in a form of a computer program product. The computer program product includes one or more computer instructions. When the computer program instructions are loaded and executed on the computer, the procedure or functions according to the embodiments of the present disclosure are completely or partially generated. The computer may be a general-purpose computer, a dedicated computer, a computer network, or another programmable apparatus. The computer instructions can be stored in a computer-readable storage medium or can be transmitted from a computer-readable storage medium to another computer-readable storage medium. For example, the computer instructions can be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD), etc.

A person of ordinary skill in the art can be aware that the units and algorithm steps of each example described with reference to the embodiments of the present disclosure can be implemented by using electronic hardware, or a combination of computer software and electronic hardware. Whether these functions are performed by using hardware or software depends on specific application and design constraints of the technical solutions. A skilled person can use different methods for each specific application to implement the described functions, but this implementation should not be considered as beyond the scope of the present disclosure.

In the several embodiments provided in the present disclosure, it should be understood that the disclosed system, apparatus, and method can be implemented in other ways. For example, the apparatus embodiments described above are merely examples. For example, the unit division is merely logical function division and may be other division in actual implementation. For example, a plurality of units or components can be combined or integrated into another system, or some features may be ignored or not performed. In addition, the displayed or discussed mutual couplings or direct couplings or communication connections can be implemented through some interfaces. The indirect couplings or communication connections between the apparatuses or units can be implemented in electronic, mechanical, or other forms.

The units described as separate components may or may not be physically separate, and components displayed as units may or may not be physical units, can be located in one position, or can be distributed on a plurality of network units. Some or all of the units can be selected depending on actual needs to achieve the purposes of the solutions of the embodiments.

In addition, the functional units in the embodiments of the present disclosure can be integrated into one processing unit, or each of the units may exist alone physically, or two or more of the units can be integrated into one unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for managing graph data, comprising:
receiving a first request, wherein the first request is used to request to perform an edge scanning operation on edge data of a timing graph based on a time range, the edge data is stored in a graph database, the edge data records a plurality of attributes of an edge in the timing graph, the plurality of attributes comprise a timestamp, an index of the edge data comprises a primary index and a secondary index, a value of the primary index is the timestamp, the secondary index stores the plurality of attributes, and a key of the secondary index comprises the timestamp; and
performing the edge scanning operation on the edge data of the timing graph by using the timestamp in the key of the secondary index, to obtain an edge of which timestamp falls within the time range in the timing graph.

2. The method according to claim 1, wherein a key and a value of the primary index jointly form the key of the secondary index.

3. The method according to claim 2, wherein the method further comprises:
when a target edge in the timing graph needs to be updated or deleted, searching the primary index for the target edge to obtain a position of the target edge in the primary index;
constructing the key of the secondary index based on a key and a value that are recorded at the position;
searching the secondary index for the target edge based on the key of the secondary index to obtain a position of the target edge in the secondary index; and
updating or deleting the target edge based on the positions of the target edge in the primary index and the secondary index.

4. The method according to claim 1, wherein the key of the primary index successively comprises a source vertex, an edge type, and a destination vertex of the edge in the timing graph.

5. The method according to claim 1, wherein the key of the secondary index successively comprises a source vertex, an edge type, a timestamp, and a destination vertex of the edge in the timing graph.

6. An apparatus for managing graph data, comprising:
a means for receiving module, configured to receive a first request, wherein the first request is used to request to perform an edge scanning operation on edge data of a timing graph based on a time range, the edge data is stored in a graph database, the edge data records a plurality of attributes of an edge in the timing graph, the plurality of attributes comprise a timestamp, an index of the edge data comprises a primary index and a secondary index, a value of the primary index is the timestamp, the secondary index stores the plurality of attributes, and a key of the secondary index comprises the timestamp; and
a means for performing module, configured to perform the edge scanning operation on the edge data of the timing graph by using the timestamp in the key of the secondary index, to obtain an edge of which timestamp falls within the time range in the timing graph.

* * * * *